UNITED STATES PATENT OFFICE.

VICENTE CATALÁ ALSINA AND GENARO FERNANDEZ, OF BUENOS AIRES, ARGENTINA.

PROCESS OF PRESERVING MANUFACTURED OR LEAF TOBACCO.

1,352,421.　　　　　Specification of Letters Patent.　　Patented Sept. 14, 1920.

No Drawing.　　　Application filed June 26, 1916. Serial No. 105,924.

*To all whom it may concern:*

Be it known that we, VICENTE CATALÁ ALSINA and GENARO FERNANDEZ, subjects of the King of Spain, residing in the city of Buenos Aires, Argentine Republic, have invented a new and useful Process of Preserving Manufactured or Leaf Tobacco, of which the following is a specification.

Tobacco, as other plants, is composed of two groups of substances, the organic substances which disappear in the form of gases on combustion, and the mineral substances, which remain after combustion forming the ash. The freshly cut leaf, taking an average of a series of analyses, gives the following figures:

Water 88%, organic matter 11%, mineral matter 1%, total 100%. The already dried leaves (air dried) give, on calcination, 22% of ash, which is apparently formed by the mineral acids, sulfuric, nitric, hydrochloric and phosphoric, combined with alkaline bases, ammonia, potash, lime, magnesia, and iron. Silica is always present and soda and manganese frequently found.

The principal organic compounds are cellulose, lignin, gums, the vegetable acids (malic, citric, oxalic and pectic) combined with the mineral bases mentioned and with the organic base or specific alkaloid of tobacco, nicotin.

The greater portion of these compounds, such as the cellulose, lignin and organic acids are found in all tobaccos in almost invariable proportion; others, such as the mineral bases and the nicotin are extremely variable, imparting distinctive properties to the various kinds of leaf.

During the fermentation of the tobacco a part of the organic acids present are converted into nicotin compounds, to which the fermented (ripened or cured) tobacco owes its special aroma. During the fermentation of the tobacco a portion of the nicotin is decomposed, forming ammonia, a part of which is converted into ammonium compounds and a part of which vaporizes, while the undecomposed nicotin is largely converted into organic compounds of nicotin. A small part of the nicotin also evaporates and is thereby lost during fermentation.

After careful study and extensive experimentation, we have found that the destruction of tobacco by the insects known as *Lasioderma serricorne*—Fabr., *Satedrepa panicea*—L. (commonly called tobacco moth) and similar insects is made possible by the lack of heating properties in the tobacco, and the tobacco which has the necessary heating properties will not be injured by these insects.

We have further found that the necessary heating properties can be added to the tobacco, by subjecting the same to the action of vanilla and tonka bean. For this purpose we employ the dried fruits of the aromatic vanilla, Swartz or the *Vanilla planifolia* Andrews or Mexican (commonly called aromatic) vanilla, and also the dried fruits of the *Dipteryx odorata* (commonly called tonka, Turkish or Kamerun bean).

It is understood that in this specification by the term "insects" is meant the species above referred to and species similar thereto, and by the terms of "vanilla and tonka beans," we likewise include the fruits of other plants having the same or similar properties.

We have found that for the preservation of a bale of tobacco weighing 45 kilograms, 6 grams of vanilla and 2 grams of tonka are sufficient. In employing these materials we preferably mix the vanilla, grind or comminute the material, and after mixing, divide the quantity into three approximately equal parts. For manufactured tobacco, on account of the fact that this has already had much more contact with air and moisture, during the process of manufacture, as well as while being pressed and treated, 500 milligrams of the mixture of vanilla and tonka (for example 300 milligrams of vanilla and 200 of tonka) should be employed for each box of 100 plugs of tobacco.

In destroying the aforesaid materials in the bale of tobacco, we preferably place the materials put up in three separate packages, in three widely separated places in the bale. Thus we may place one of the packages near the bottom, one near the middle and one near the top of the bale. In preserving manufactured tobacco, we preferably proceed in the same way, placing the comminuted materials in perforated tin foil or similar material, and placing the three packages of this one in the bottom of the box, one near the middle and one near the top. In the case of unmanufactured tobacco the aroma of the vanilla and tonka bean is sufficiently absorbed by the tobacco within about 10 days, while in the case of manufactured tobacco, it is preferable to leave the packages of vanilla and tonka in the box of tobacco until the entire box has been used or sold.

In both cases the packages of vanilla and tonka, when removed from the tobacco may be employed again, provided they are kept dry and in a sealed container.

Tobacco treated in this way is found to be not only of very greatly improved aroma and flavor, but also is found to be entirely immune to attack by the tobacco moth and the other insects above referred to.

The term "manufactured tobacco" as herein employed is intended not only to cover plug tobacco, but also cigars, cigarettes, etc.

What we claim is:

A process of preventing injury to tobacco products, by the tobacco moth and other similar insects, which comprises subjecting the tobacco products to the odors emanating from a mixture comprising a mixture of vanilla beans and tonka beans, said mixture being placed in proximity with the said tobacco products, but being protected from actual contact therewith, and allowing the tobacco products to absorb said odors.

In testimony whereof we have signed our names to this specification in the presence of two subscribing witnesses.

VICENTE CATALÁ ALSINA.
GENARO FERNANDEZ.

Witnesses:
C. L. AYMUSE,
JUAN MUCHAL.